(12) United States Patent
Yang et al.

(10) Patent No.: US 10,277,617 B2
(45) Date of Patent: *Apr. 30, 2019

(54) METHOD AND DEVICE FOR FEATURE EXTRACTION

(71) Applicant: BEIJING QIHOO TECHNOLOGY COMPANY LIMITED, Beijing (CN)

(72) Inventors: Kang Yang, Beijing (CN); Zhuo Chen, Beijing (CN); Hai Tang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 164 days.

This patent is subject to a terminal disclaimer.

(21) Appl. No.: 15/109,409

(22) PCT Filed: Oct. 31, 2014

(86) PCT No.: PCT/CN2014/090035
§ 371 (c)(1),
(2) Date: Jun. 30, 2016

(87) PCT Pub. No.: WO2015/101097
PCT Pub. Date: Jul. 9, 2015

(65) Prior Publication Data
US 2016/0335437 A1    Nov. 17, 2016

(30) Foreign Application Priority Data

Dec. 30, 2013   (CN) .......................... 2013 1 0746033

(51) Int. Cl.
*H04L 29/06*    (2006.01)
*G06F 21/56*    (2013.01)

(52) U.S. Cl.
CPC .......... *H04L 63/1425* (2013.01); *G06F 21/56* (2013.01); *G06F 21/562* (2013.01); *G06F 21/563* (2013.01); *G06F 21/566* (2013.01)

(58) Field of Classification Search
CPC ....... G06F 21/56; G06F 21/562; G06F 21/566
See application file for complete search history.

(56) References Cited

U.S. PATENT DOCUMENTS

| | | | |
|---|---|---|---|
| 2007/0196801 A1 | 8/2007 | Nagasaka et al. | |
| 2007/0240217 A1* | 10/2007 | Tuvell | G06F 21/56 726/24 |
| 2011/0145920 A1* | 6/2011 | Mahaffey | G06F 21/564 726/22 |

FOREIGN PATENT DOCUMENTS

| | | |
|---|---|---|
| CN | 101923617 A | 12/2010 |
| CN | 103383720 A | 11/2013 |
| CN | 103761476 A | 4/2014 |

* cited by examiner

*Primary Examiner* — Harunur Rashid
(74) *Attorney, Agent, or Firm* — Baker & Hostetler LLP (57) ABSTRACT

Provided are a method and device for feature extraction. The method comprises: acquiring a batch of black sample files and white sample files from an application layer of a smart terminal operating system; parsing each file, acquiring information structure of all functions contained in each file, and computing a checksum for each function; determining whether or not the files contain the functions corresponding to the checksums, thus compiling statistics on the number of occurrences of each function in the black sample files and the white sample files; and, extracting a black sample feature on the basis of functions occurring only in the black sample files and not occurring in the white sample files, or extracting a white sample feature on a similar basis.

16 Claims, 4 Drawing Sheets

METHOD AND DEVICE FOR FEATURE EXTRACTION

CROSS-REFERENCE TO RELATED APPLICATIONS

This application is a national stage of International Application No. PCT/CN2014/090035, filed Oct. 31, 2014, which is based upon and claims priority to Chinese Patent Application No. CN201310746033.6, filed Dec. 30, 2013, the entire contents of all of which are incorporated herein by reference.

FIELD OF TECHNOLOGY

The disclosure relates the field of network security technologies, and in particular to a method and device for feature extraction.

BACKGROUND

With development of science and technique, intelligent terminals have more and more functions. For example, user's mobile phones have varied from traditional GSM and TDMA digital phones to intelligent phones capable of handling multimedia resources and providing multiple types of information services such as web browsing, telephone conference, e-business and etc. However, more variety of malicious code attacks for mobile phones and increasingly serious situation of personal data security problem has emerged accordingly. The users of intelligent mobile phone are suffering from increasing viruses for the mobile phone.

Protection technologies against malicious codes of mobile phone can defend against the malicious codes. The protection manners against malicious codes of mobile phone are diverse, for example, including feature value scanning, protection against malicious code based on virtual machine techniques, heuristic scanning and similar sample clustering. Regardless of the protections, except for the efficient scanning algorithm (also known as matching algorithm), it is elementary to organize an advisable malicious code feature library. Therefore, how to accurately and efficiently extract features would be essential for establishment of the feature library or even for the whole protection technologies.

SUMMARY

In the view of above problems, embodiments of the disclosure are proposed to provide a method and device for feature extraction to overcome or at least partially resolve above problems.

According to one aspect of the disclosure, there is provided a method for feature extraction, wherein the method comprises steps of: acquiring a batch of black sample files and white sample files from an application layer of an intelligent terminal operating system; parsing each file to acquire information structures of all functions contained in each file, and calculating a check code for each function; determining whether the files contain the functions corresponding to the check codes, and thus counting the occurrence number of each function in the black sample files and the white sample files; and extracting a black sample feature on the basis of functions occurring only in the black sample files but not occurring in the white sample files, or extracting a white sample feature on the basis of functions occurring only in the white sample files but not occurring in the black sample files.

According to another aspect of the disclosure, there is provided a device for feature extraction, comprising: a file acquisition unit, configured to acquire a batch of black sample files and white sample files from an application layer of an intelligent terminal operating system; a parsing unit, configured to parse each file to acquire information structures of all functions contained in each file; a check code calculation unit, configured to calculate a check code for each function; a counting unit, configured to determine whether the files contain the functions corresponding to the check codes, and thus count the occurrence number of each function in the black sample files and the white sample files; and an extraction unit, configured to extract a black sample feature on the basis of functions occurring only in the black sample files but not occurring in the white sample files, or extract a white sample feature on a similar basis of functions occurring only in the white sample files but not occurring in the black sample files.

As could be seen, in the embodiments of the disclosure, by analyzing and calculating the acquired black sample files and white sample files and counting the occurrence number of the Hash values of each function in the file, the functions occurring in the black sample files but not occurring in the white sample files are finally used as the basis of the feature extraction. As a result, by promptly and exactly extracting the features, it is possible to ensure the construction of efficient feature library and the implementation of protection technologies. Preferably, the feature preference may be performed so as to detect out the most files by using the least features after a plenty of extractable black sample features are obtained.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to a person having ordinary skill in the art. Accompanying drawings are merely included for the purpose of illustrating the preferred embodiments and should not be considered as limiting of the invention. Further, throughout the drawings, same elements are indicated by same reference numbers. In the drawings.

DESCRIPTION OF THE EMBODIMENTS

Exemplary embodiments of the disclosure will be described in detail with reference to the accompanying figures hereinafter. Although the exemplary embodiments of the disclosure are illustrated in the accompanying figures, it should be understood that the disclosure may be embodied in many different forms and should not be construed as being limited to the embodiments set forth herein. Rather, these embodiments are provided so that this disclosure will be understood thoroughly and completely and will fully convey the scope of the disclosure to those skilled in the art.

Taking Android operating system as an example, it may include an application layer (app layer) and a system framework layer (framework layer). Other layers which are possibly included when divided by function will not be discussed in the disclosure. Herein, in general, the app layer can be considered to be an upper layer which is responsible for an interface interacting with the user (for example, application program maintenance) and for recognizing various types of click content when clicking page to display different contextual menus. Usually, the framework layer is regarded as a medium layer which is mainly responsible for forwarding a user request (for example, starting application, clicking link and clicking "Save Picture") obtained by the app layer to a lower layer; and handing out the processed contents in the lower layer to the upper layer by a message or an intermediate agent to exhibit to the user.

The inventor of the disclosure has found during research that, by counting the occurrence number of check codes of function contained in a sample file, it can be determined whether the function is a black sample or a white sample.

Figure 1:
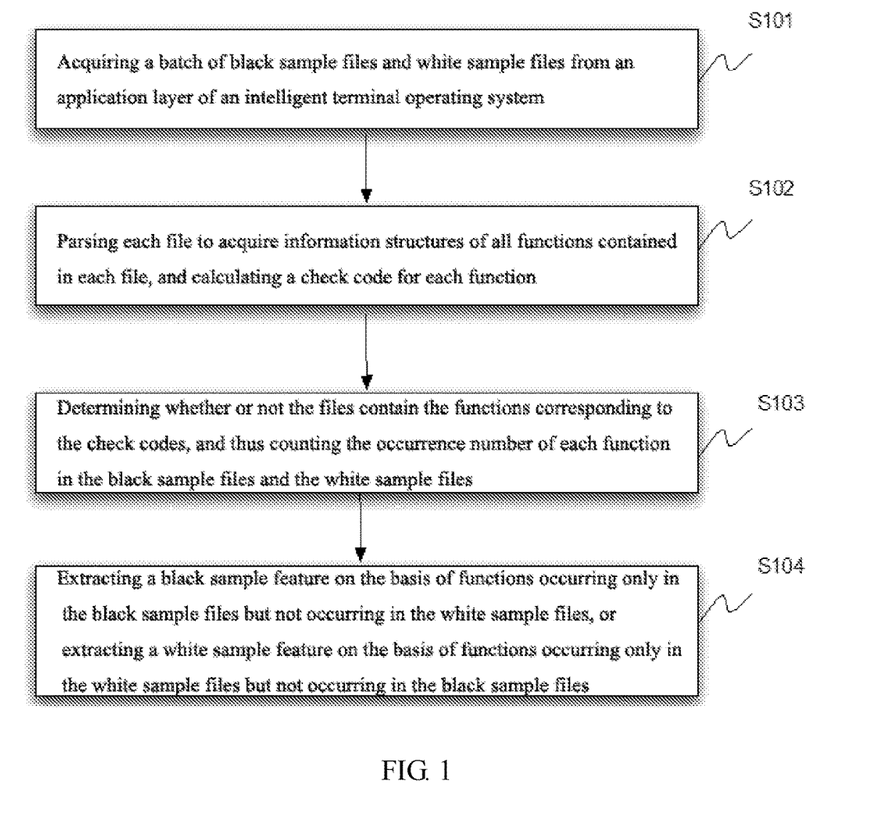
FIG. 1 illustrates a flowchart of a method for feature extraction according to an embodiment of the disclosure.

With reference to FIG. 1, it illustrates a flowchart of a method for feature extraction according to an embodiment of the disclosure.

The method for feature extraction may comprise following steps.

S101: acquiring a batch of black sample files and white sample files from an application layer of an intelligent terminal operating system;

Herein, the black sample file refers to a file containing black sample through an advance preliminary determination, such as a file containing malicious codes; and the white sample file refers to a file not containing black sample through an advance preliminary determination, such as a file not containing malicious codes. A person skilled in the art may understand that, in the process of matching and searching/killing the malicious codes, it is necessary to establish a feature library and the establishment of the feature library is based on the feature extraction of sample files. In the embodiment of the disclosure, it may be determined manually in advance whether a batch of files is the black sample files or the white sample files. The more the black sample files and white sample files the better, so as to assist in accurately extracting the sample feature.

In the embodiment of the disclosure, the black sample file or the white sample file could be a dex file, for example. The dex file could be a virtual machine executable file which is loaded and operated directly on a Dalvik virtual machine (Dalvik VM) in Android system. Dalvik is a Java virtual machine for an Android platform. With optimization, the Dalvik may allow for simultaneously operating multiple virtual machine instances in a limited memory space and each of Dalvik applications as an individual Linux process can be executed. The individual process may prevent shutting down all the applications when the virtual machine is collapsed. The Dalvik virtual machine may support operation of a Java application which has converted to a dex (Dalvik Executable) format. The dex format is a kind of compressed format which is specially designed for Dalvik and which is suitable for a system having a memory and a processor with limited speed. By ADT (Android Development Tools) and by complicated compiling, Java source code can be converted to a dex file. The dex file is an optimized result for embedded system. An instruction code of the Dalvik virtual machine is not a standard Java virtual machine instruction code but has its own unique instruction set. The dex file shares loads of class names and constant strings, such that it has a relatively small size and high operational efficiency.

Particularly, the way of acquiring a batch of black sample files and white sample files from the application layer of the smart terminal could include: searching out an application installation package from the application layer of the intelligent terminal operating system; parsing the installation package to obtain dex files of the application; and using the dex executable files as the black sample files or the white sample files. For example, the dex files may be obtained by parsing APK (Android Package). The APK file, in fact, is a compressed package of zip format, but its suffix name is modified to apk. With decompression by Unzip, the Dex file can be obtained.

As described above, Android operating system may include the application layer (app layer) and the system framework layer (framework layer). The disclosure focuses on the research and development of the app layer. However, a person skilled in the art may understand that when the Android is started, the Dalvik VM may monitor all the programs (APK files) and the framework and establish a dependence relationship tree for them. The Dalvik VM may optimize codes for each program by the dependence relationship tree and store them in Dalvik cache (dalvik-cache). In this manner, each program may use the optimized codes in running. When a program (or framework library) is modified, the Dalvik VM may re-optimize the codes and restore them in the cache. The cache/dalvik-cache is used to store the dex files generated by the program in the system, while the data/dalvik-cache is used to store the dex files generated by data/app. In other words, the disclosure focuses on analyzing and processing of the dex files generated by the data/app. However, it should be understood that the principle and operation of the disclosure are also applicable to the dex files generated by the program in the system.

S102: parsing each file to acquire information structures of all functions contained in each file, and calculating a check code for each function;

Still taking the dex file as an example, the step of parsing each file to acquire information structure of all functions contained in the file may include: decompiling the dex file to acquire decompiled information structure of all functions contained in the dex file.

Herein, the decompiling (or known as disassembling) of the dex file may be implemented in diverse manners.

In a first manner, the dex file may be parsed on the basis of dex file format to acquire a function information structure body of each class; on the basis of fields in the function information structure body, a location and size of the function in the dex file can be determined to acquire a decompiled function information structure. Herein, by parsing the function information structure body, a byte code array field indicating a function location of the dex file and a list length field indicating a function size of the dex file can be obtained, so as to determine the location and size of the functions in the dex file.

For example, the dex file may be parsed on the basis of dex file format to search out the function information body of each class. For example, the function information structure body may contain the fields as shown in Table 1.

TABLE 1

| | | |
|---|---|---|
| registers_size | ushort | The number of registers used by this segment of codes. |
| ins_size | ushort | The number of words of method input parameter in this segment of codes. |
| outs_size | ushort | A space required to be provided for an output function of the function in an invocation method of this segment of codes. |
| tries_size | ushort | The number of try_item of this object, wherein if not 0, it, as a tries array, will occur following insns of this object. |
| debug_info_off | uint | An offset from the file to debug info, wherein if no information, its value will be 0; if not 0, then this will indicate a position of data segment and data will be necessary to follow a format specified by debug_info_item. |
| insns_size | uint | A length of Instructions list at a unit of two bytes. |
| insns | ushort[insns_size] | A byte code array, in which a format of the byte code array is described in a file "Bytecode for the Dalvik VM"; although it is defined as a ushort type of array, some of internal structures have 4-byte alignment; and if this file is just right a file after a byte exchange operation, the byte exchange will occur only inside the ushort type. |
| padding | ushort (optional) = 0 | Two padding bytes are used to satisfy the 4-byte alignment of tries. This element appears only when tries_size is not 0 and an odd number. |
| tries | try_item[tries_size] (optional) | This array is used to identify a location where abnormity probably occur in representation and how to handle. Array elements are necessarily arranged in an ascending order without repetitive address. This element appears only when tries_size is not 0. |
| handlers | encoded_catch_handler_list (optional) | These codes represent a series of abnormal types and an address list of their handling method, each try_item has an offset by a byte width. This element appears only when tries_size is not 0. |

Herein, insns_size and insns fields in each function information structure body represent the size and the position of the function, respectively. Then, on the basis of the two fields of insns_size and insns, the information structure of function can be decompiled. The decompiled information structure is constructed by the Dalvik VM byte codes, which will be described later in detail.

In a second manner, a decompiling tool for dex file can be used to decompile the dex file to the virtual machine byte codea.

As discussed above, the Dalvik byte codes run in the Dalvik virtual machine and are embodied as a dex (Dalvik Executable) executable file. The Dalvik virtual machine may execute the codes by interpreting the dex file. Some existing tools may disassemble the DEX file to Dalvik assembly codes. These types of dex file decompiling tool may include: baksmali, Dedexer 1.26, dexdump, dexinspecto 03-12-12r, IDA Pro, androguard, dex2jar, 010 Editor, for example.

As could be seen, by decompiling of the dex file, decompiled function information structure can all be obtained. Herein, the function information structure contains function execution codes, and in the embodiment of the disclosure, is composed of virtual machine instruction sequence and virtual machine mnemonic symbol sequence. As an example below, the instruction sequence of Dalvik VM and the mnemonic symbol sequence of Dalvik VM form the function information structure.

For example, the function information structure obtained by decompiling the dex file according to an embodiment of the disclosure is as follows:

| offset | machine code | | | instruction mnemonics and instruction oprands |
|---|---|---|---|---|
| 000000: | 1203 | | 0000: | const/4 v3, #int 0 // #0 |
| 000002: | 5474 | 5609 | 0001: | iget-object v4, v7, Lcom/biznessapps/activities/CommonFragments; |
| 000006: | 3804 | 3a00 | 0003: | if-eaz.v4, 003d // +003a |
| 00000a: | 7100 | 020f 0000 | 0005: | invoke-static { }, Lcom/biznessapps/api/AppCore;.getinstance; |
| 000010: | 0c04 | | 0008: | move-result-object v4 |
| 000012: | 6e10 | fc0e 0400 | 0009: | invoke-virtual {v4}, Lcom/biznessapps/api/AppCore; getAppSettings; |
| 000018: | 0c00 | | 000c: | move-result-object v0 |
| 00001a: | 6e10 | fd1c 0000 | 000d: | invoke-virtual {v1}, Lcom/biznessapps/model/Appsettings: isEmpty; |
| 000020: | 0a04 | | 0010: | move-result v4 |
| 000022: | 3804 | 2f00 | 0011: | if-eqz v4, 0040 // +002f |
| 000026: | 5474 | 5509 | 0013: | iget-object v4, v7, Lcom/biznessapps/activities/CommonFragments; |
| 00002a: | 5475 | 5609 | 0015: | iget-object v5, v7, Lcom/biznessapps/activities/CommonFragments: |
| 00002e: | 6e10 | f40c 0700 | 0017: | invoke-virtual {v7}, Lcom/biznessapps/activitles/CommonFragments; |
| 000034: | 0c06 | | 001a: | move-result-object v6 |
| 000036: | 6e80 | 9c19 5406 | 001b: | invoke-virtual-{v4,.v5, v6}, Lcom/biznessapps/fragments/utils/Music; |
| 00003c: | 5474 | 5509 | 001e: | iget-object.v4, v7, Lcom/biznessapps/activities/CommonFragments; |
| 000040: | 6e10 | 9a19 0400 | 0020: | invoke-virtual {v4}, Lcom/biznessapps/fragments/utils/Music; |
| 000046: | 0c04 | | 0023: | move-result-object v4 |
| 000048: | 6e10 | 8b20 0400 | 0024: | invoke-virtual {v4}, Lcom/biznessapps/player/PlayerServiceAccept; |
| 00004e: | 0c02 | | 0027: | move-result-object v2 |
| 000050: | 3802 | 1600 | 0028: | if-eqz v2, 003e // +0016 |
| 000054: | 7210 | 0b33 0200 | 002a: | invoke-interface.{v2}, Ljava/util/List; isEmpty:z // method; |
| 00005a: | 0a04 | | 002d: | move-result v4 |
| 00005c: | 3904 | 1000 | 002e: | if-nez v4, 003e // +0010 |

-continued

| offset   | machine code      | instruction mnemonics and instruction oprands                              |
|----------|-------------------|----------------------------------------------------------------------------|
| 000060:  | 1211              | 0030: const/4 v1, #int 1 // #1                                             |
| 000062:  | 3801 0700         | 0031: if-eqz v1, 0038 // +0007                                             |
| 000066:  | 5474 5609         | 0033: iget-object v4, v7, Lcom/biznessapps/activities/CommonFragments;     |
| 00006s:  | 6e20 9409 3400    | 0035: invoke-virtual {v4, v3}, Landroid/view/viewgroup: setvisibility;     |
| 000070:  | 5473 5909         | 0038: iget-object v3, v7, Lcom/biznessapps/activities/CommonFragments      |
| 000074:  | 7110 6420 0300    | 003a: invoke-static {v3}, Lcom/biznessapps/player/PlayerService: setVisibility; |
| 000075:  | 0e00              | 003d: return-void                                                          |
| 00007c:  | 0181              | 003e: move v1, v3                                                          |
| 00007e:  | 28f2              | 003f: goto 0031 // -000e                                                   |
| 000080:  | 5473 5609         | 0040: iget-object.v3, v7, Lcom/biznessapps/activities/CommonFragments;     |
| 000084:  | 1304 0800         | 0042: const/16 v4, #int 8 // #8                                            |
| 000088:  | 6e20 9409 4300    | 0044: invoke-virtual {v3, v4}, Landroid/view/ViewGroup: setvisibility:     |

As could be seen, the dex file can be compiled to the instruction sequence of Dalvik VM and the mnemonic symbol sequence of Dalvik VM. As in above example, in the function information structure acquired by decompiling, first two numbers of each line in a machine code field is the instruction sequence (the circled part on the left side in above example), while the part corresponding to the instruction sequence is the mnemonic symbol (parts of above example on the right side are circled rather than all selected). The mnemonic symbol is mainly used to easily communicate and edit codes for the users.

Having the information structure of each function, it is possible to calculate out a check code of this function and subsequently represent its corresponding unique function by using the check code. Existing or future algorithms would be used to calculate the check code of function. For example, a Hash algorithm can be used to a Hash value of function as the aforesaid check code. Herein, there are a variety of Hash algorithms, for example, including CRC (Cyclical Redundancy Check), MD5 (Message Digest Algorithm, fifth edition) or SHA (Secure Hash Algorithm).

S103: determining whether the files contain the functions corresponding to the check codes, and thus counting the occurrence number of each function in the black sample files and the white sample files.

This step is to count the occurrence number of Hash value for step S101 of acquiring a batch of black sample files and white sample files.

It is assumed to determine the Hash value of each function by the analysis and calculation on the black sample files and the white sample files; and then to count the occurrence number of each Hash value in the black sample files and the white sample files.

It is assumed that there are n sample files (including a part of black sample files and a part of white sample files), in which the first file contains function Hash values A, B, C; the second file contains function Hash values A, C, D; the third file contains function Hash values B, C, E; . . . the nth file contains function Hash values C, D. In short, after all the files have undergone analysis, it is assumed to determine 5 function Hash values A, B, C, D, E. Then, the occurrence number of the 5 function Hash values in the black sample files and the occurrence number in the white sample files are counted. It is assumed that a result is shown in Table 2 upon counting.

TABLE 2

| Function Hash value | Occurrence number in files in total | Occurrence number in black sample files | Occurrence number in white sample files |
|---|---|---|---|
| A | 10000 | 5000 | 5000 |
| B | 10000 | 10000 | 0 |
| C | 10000 | 0 | 10000 |
| D | 10000 | 8000 | 2000 |
| E | 7000 | 7000 | 0 |

A person having skill in the art may understand that different functions have different Hash values, which means that different Hash values represent different functions. Therefore, subsequently A, B, C, D, E may also be used to represent 5 functions or 5 features. By the occurrence number of Hash value in the files, the occurrence number of each function in the files can be determined.

Preferably, before counting the occurrence number of each function in the black sample files and in the white sample files, the method may further include: performing in-file de-repetition on the check code of function. In particular, the step of performing in-file de-repetition on the check code of function means that, if multiple functions has the same check code, then a function may be extracted from the multiple functions as a function of the check code. For example, in the case of one dex file, it is parsed to acquire the information structures of all functions contained therein; it is assumed that three information structures s1, s2 and s3 are parsed out, then 3 respective Hash values hash1, hash2 and hash3 of the information structures s1, s2 and s3 can be acquired by the Hash algorithm. The person having skill in the art may understand that different functions have different Hash values, which means that different Hash values represent different functions. It is assumed that some of three Hash values are equal (for example, hash1=hash2), then they would be considered to represent the same function. At this point, either one of s1 and s2 is selected while the other one is discarded.

S104: extracting a black sample feature on the basis of functions occurring only in the black sample files but not occurring in the white sample files, or extracting a white sample feature on the basis of functions occurring only in the white sample files but not occurring in the black sample files.

When the sample is extracted, the functions occurring only in the black sample files but not occurring in the white sample files are selected to perform the black sample feature extraction. For example, with reference to Table 1 again, functions B and E are selected to perform the black sample feature extraction. In particular, functions B and E may be used as the black sample feature, or a portion of codes of the functions B and E may be used as the black sample feature. Similarly, the functions occurring only in the white sample files but not occurring in the black sample files are selected to perform the white sample feature extraction. For example, with reference to Table 1 again, a function C is selected to perform the white sample feature extraction. In particular, the function C may be used and the white sample feature, or a portion of codes of the function C may be used as the white sample feature.

After the black sample feature is extracted at S104, following steps may be continuously executed: adding the black sample feature to the black sample feature library; and matching a target file by using black sample feature library, wherein if the target file contains a function or a subset of function corresponding to the black sample feature, the presence of malicious codes is determined. As understood by those skilled in the art, the function corresponding to the black sample feature in the black sample feature library can be used to perform sample feature searching/killing, virtual machine based searching/killing, heuristic searching/killing or similar sample clustering on the target file.

Hereinafter the malicious code and protection schemes against malicious codes (sample feature searching/killing, virtual machine based searching/killing, heuristic searching/killing or similar sample clustering) will be introduced.

The malicious code refers to program or code which is transmitted through storage medium or network, destroys integrity of the operating system without authorization and grabs unopened secret information in the system. By taking mobile phone as an example, mobile phone malicious code refers to malicious code directing to handheld equipment such as mobile phone, PDA, etc. The mobile malicious code may be simply divided into duplicated malicious code and non-duplicated duplicated malicious code. Herein the duplicated malicious code may mainly include Virus and Worm, while the non-duplicated malicious code may mainly include Trojan Horse, Rogue Software, Malicious Mobile Code and Rootkit program.

The mobile phone malicious code protection technologies may provide protection against the malicious codes. The mobile phone malicious code protection may include a variety of manners. For example, a feature value scanning manner is needed to study and establish a malicious code feature library in advance. The feature value stored in the malicious code feature library could be a section of continuous and fixed character string or could be feature strings determined by sections of discontinuous character strings with unfixed characters interposed. When scanning, files or memories to be detected may be detected on the basis of the feature value or feature string in the feature library, and if a matched item is found, then it may be determined that the target is infected the malicious code. The virtual machine technique based malicious code protection is taken as another example. The protection scheme is directed to polymorphic and variant viruses. The so-called virtual machine means that software is used to simulate a complete computer system having complete hardware system functions and running in a completely isolated environment. This scheme is also known as a software simulation method which is a software analyzer which uses software method to simulate and analyze the operation of program. In fact, this scheme may simulate a small closed program execution environment in the memory, in which all the files to be searched and killed are virtually executed. When the virtual machine technique is employed to kill the viruses, the feature value scanning process is firstly used. When a target having encrypted malicious code feature is found, a virtual machine module is activate to allow the encrypted codes to automatically decode. After they are decoded, the traditional feature value scanning process may be employed to perform searching/killing. The heuristic scanning method is taken as another example. The heuristic scanning scheme is mainly directed to continuously varied malicious codes and for the purpose of enhancing the researches on unknown malicious codes. The so-called "heuristic" originates from artificial intelligence and refers to "an ability of self-discovery" or "knowledge and skill to determine objects by utilizing a certain way or method". The heuristic scanning of malicious codes means that scanning software is able to detect viruses by using rules extracted from experience by analyzing the structure and behavior of the program. Since the malicious code seeks for infection and destruction, the ordinary behaviors thereof have some features, such as unconventionally reading/writing of files, self-ending, unconventionally typing-in null ring, etc. Therefore, by scanning specific behaviors or a combination of multiple behaviors, it is possible to determine whether a program contains malicious codes. In addition, the similar sample clustering may be performed on the target program. For example, K mean value clustering algorithm may be employed to cluster the similar samples determined by analysis.

Regardless of the protection manners, kernels thereof contain two parts wherein one part is to organize an advisable malicious code feature library and the other part is an efficient scanning algorithm (also called as a matching algorithm). The matching algorithm is generally divided into single-mode matching algorithm and multi-mode matching algorithm. The single-mode matching algorithm includes a BF (Brute-Force) algorithm, a KMP (Knuth-Morris-Pratt) algorithm, a BM (Boyer-Moore) algorithm and a QS (Quick Search) algorithm. The multi-mode matching algorithm includes a typical multi-mode matching DFSA algorithm and a multi-mode matching algorithm based on sequential binary tree. In addition, the matching algorithm may also be divided into a fuzzy matching algorithm and an approximate matching algorithm.

It should be explained that the disclosure does not limit the malicious codes protection scheme which is used to detect the malicious codes. For example, it is possible to employ the sample feature searching/killing (feature value scanning), the virtual machine based searching/killing or the heuristic searching/killing as explained above, and the similar sample clustering may also be performed. Further, the matching algorithm is also not limited. For example, it is possible to employ the fuzzy matching algorithm and the approximate matching algorithm as explained above.

There is a case in which a file set detecting out function A contains a file set detecting out function B. This case preferably uses the function A as the feature while discarding the feature of the function B. This is because, after a plenty of extractable black sample features are acquired, it is necessary to consider how to detect out the most files by the least features. The object can be achieved by the feature preference method in the embodiments of the disclosure.

In short, the feature preference method may include: for different file sets having different features, if a file set contains all files in another file set, then keeping the features corresponding to the file set with a broader range while discarding the features corresponding to the file set with a narrower range. For example, in the case of two features which are a first feature and a second feature, respectively, the files containing the first feature form a first file set, and the files containing the second feature form a second file set;

if the first file set contains all the files in the second file set, then the first feature will be kept while the second feature will be discarded.

Figure 2:
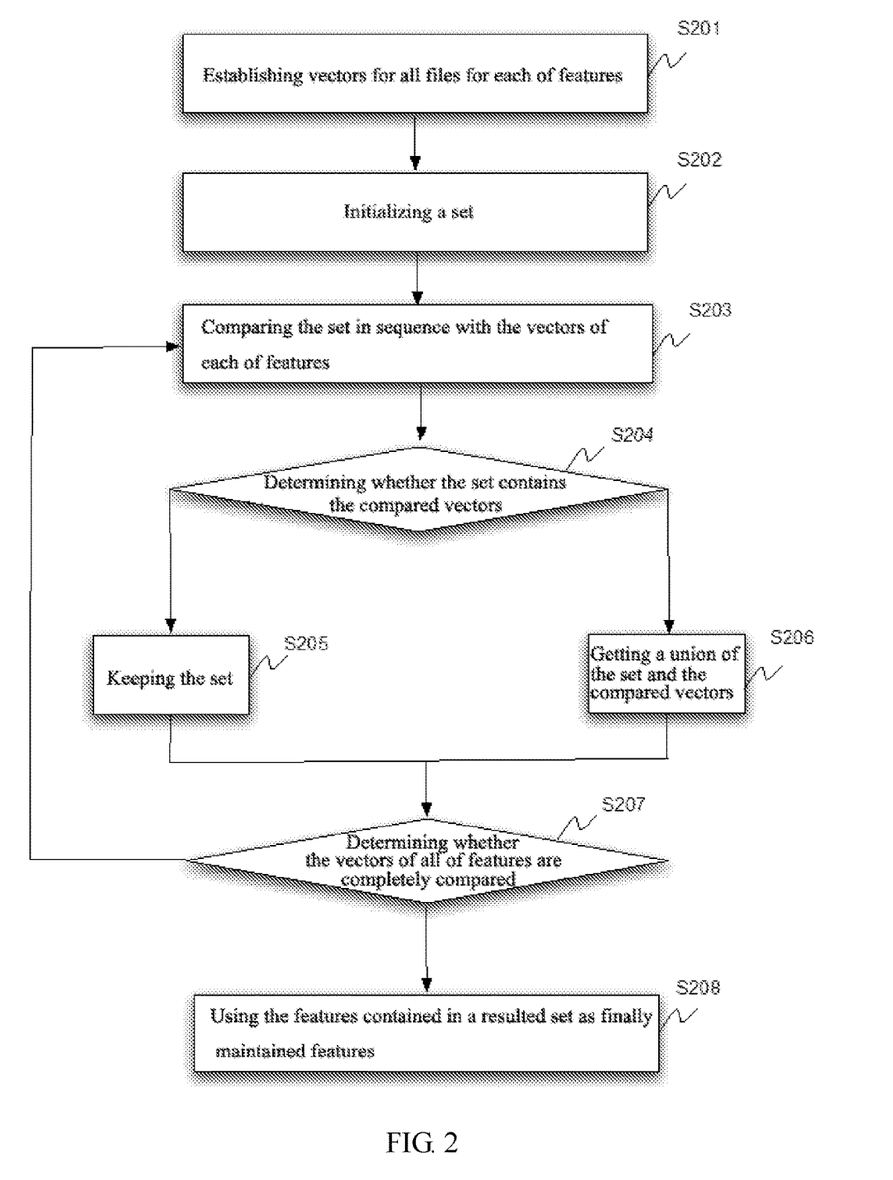
FIG. 2 illustrates a flowchart of feature preference in the method for feature extraction according to an embodiment of the disclosure.

FIG. 2 illustrates a flowchart of feature preference in the method for feature extraction according to an embodiment of the disclosure. The feature preference may include steps of:

S201: establishing vectors for all files for each of features;
S202: initializing a set;
S203: comparing the set in sequence with the vectors of each of features;
S204: determining whether the set contains the compared vectors, wherein if the set contains the compared vectors, then go to S205, or if the set does not contain the compared vectors, then go to S206;
S205: keeping the set;
S206: getting a union of the set and the compared vectors;
S207: determining whether the vectors of all of features are completely compared, wherein if yes, then go to S208, or otherwise go to S203 to compare with the vectors of next feature; and
S208: using the features contained in a resulted set as finally maintained features.

A specific example will be given below.

Assuming that there are M black sample files and N extractable features (i.e., functions), then a M-dimensional vector may be generated for each extractable feature, and an ith dimensional vector may represent whether a black sample file having an index of i can be detected out by the feature.

For example, the vectors generated by the feature A are as follows 1: 1, 2: 0, 3: 1, 4: 1, 5: 0, 6: 0, which represents three files having respective indexes 1, 3, 4 can be detected out by the feature.

Steps are as follows:
initializing a set SA and comparing it with each feature vector in sequence;
if SA contains Mi, then continuously comparing with a next feature vector set;
otherwise, getting a union of SA and Mi and then continuously comparing with a next feature vector set.

The vectors generated by Features A, B, C, D are as follows:
A: 1: 0, 2: 0, 3: 1, 4: 1, 5: 0, 6: 0
B: 1: 1, 2: 1, 3: 1, 4: 0, 5: 0, 6: 1
C: 1: 1, 2: 1, 3: 1, 4: 1, 5: 0, 6: 0
D: 1: 1, 2: 0, 3: 1, 4: 1, 5: 1, 6: 0
First Step:
comparing vectors of A and B; since A does not contain B, getting a union of A and B to obtain a detection vector: AB: 1: 1, 2: 1, 3: 1, 4: 1, 5: 0, 6: 1;
Second Step:
comparing AB with C; since AB has detected the file which can also be detected by C, discarding C;
Circling the Second Step:
comparing AB with D; since D can detect out a file 5 but AB fails, getting AB and D;
That is ABD: 1: 1, 2: 1, 3: 1, 4: 1, 5: 1, 6: 1
If there is a subsequent feature E, then the ABD will be compared with the feature E, similarly to the second step.

For above four vectors A, B, C, D, finally features A, B, D are selected.

As a result, a shortest feature set capable of detecting out M files can be obtained.

As could be seen, in the embodiments of the disclosure, by analyzing and calculating the acquired black sample files and white sample files and counting the occurrence number of the Hash values of each function in the file, the functions occurring in the black sample files but not occurring in the white sample files are finally used as the basis of the feature extraction. As a result, by promptly and exactly extracting the features, it is possible to ensure the construction of efficient feature library and the implementation of protection technologies. Preferably, the feature preference may be performed so as to detect out the most files by using the least features after a plenty of extractable black sample features are obtained.

Correspondingly to above method, an embodiment of the disclosure also provides a device for feature extraction. The device can be implemented by software, hardware or a combination of the software and the hardware. In particular, the device may be involved in a terminal apparatus or a functional entity inside an apparatus. For example, the device may be involved in a functional module. Preferably, the device may run in the Android operating system.

Figure 3:
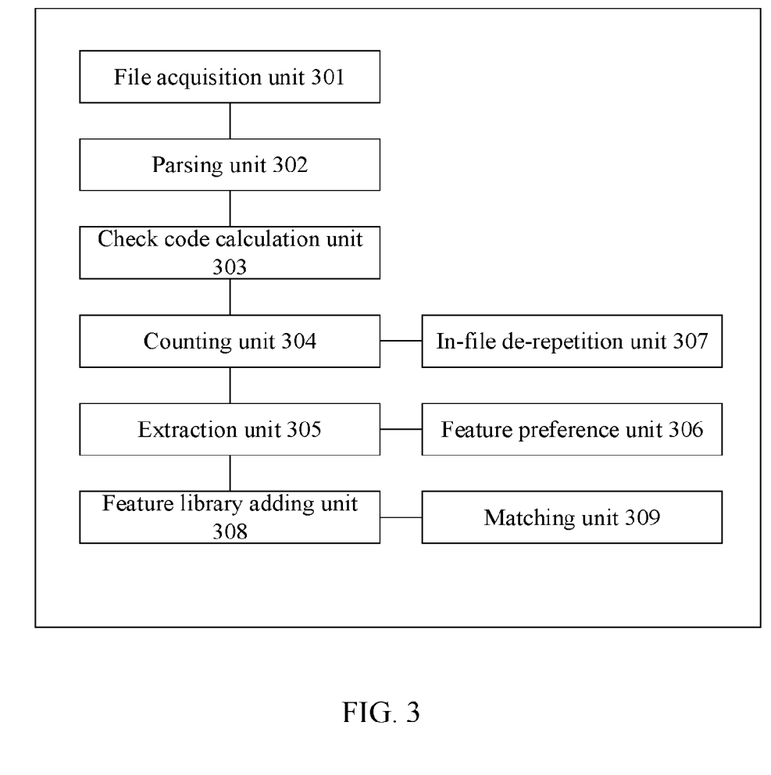
FIG. 3 illustrates a block diagram of a device for feature extraction according to an embodiment of the disclosure.

The device for feature extraction may comprise:
a file acquisition unit 301, configured to acquire a batch of black sample files and white sample files from an application layer of an intelligent terminal operating system;
a parsing unit 302, configured to parse each file to acquire information structures of all functions contained in each file;
a check code calculation unit 303, configured to calculate a check code for each function;
a counting unit 304, configured to determine whether the files contain the functions corresponding to the check codes, and thus count the occurrence number of each function in the black sample files and the white sample files; and
an extraction unit 305, configured to extract a black sample feature on the basis of functions occurring only in the black sample files but not occurring in the white sample files, or extract a white sample feature on a similar basis of functions occurring only in the white sample files but not occurring in the black sample files.

Preferably, the device may further comprise a feature preference unit 306 configured to, for different file sets having different features, if a file set contains all files in another file set, then keep the features corresponding to the file set with a broader range while discarding the features corresponding to the file set with a narrower range. For example, when a first file set contains all the files of a second file set, then the feature preference unit 306 may keep a first feature corresponding to the file set while discarding a second feature corresponding to the second file set.

Alternatively, the device may further comprise a feature preference unit 306 configured to establish vectors for all files for each of features; initialize a set, compare the set in sequence with the vectors of each of features; if the set contains the compared vectors, then keep the set, or if the set does not contain the compared vectors, then get a union of the set and the compared vectors; and compare with the vectors of all the features in sequence to use the features contained in a resulted set as finally maintained features.

Preferably, the device may further comprise an in-file de-repetition unit 307 configured to perform in-file de-repetition on the check code of function. For example, the in-file de-repetition unit 307 is particularly configured to, for each file, if multiple functions has the same check code, then extract a function from the multiple functions as a function of the check code.

Herein, both of the black sample file and the white sample file are a virtual machine executable file; and the parsing unit 302 is particularly configured to decompile the virtual machine executable file to acquire decompiled information structures of all the functions contained in the virtual machine executable file.

Herein, the check code calculation unit 303 is particularly configured to calculate a Hash value of an information structure body of the function by a Hash algorithm and use the Hash value as the check code of the function.

Herein, the parsing unit 302 is further configured to parse the virtual machine executable file on the basis of a virtual machine executable file format to acquire the function information structure body of each class; and on the basis of fields in the function information structure body, determine a location and size of each function in the virtual machine executable file to acquire a decompiled function information structure of each function.

The parsing unit 302 is further configured to parse the function information structure body to acquire a byte code array field indicating a function location of the virtual machine executable file and a list length field indicating a function size of the virtual machine executable file; and on the basis of the byte code array field and the list length field, determine the location and size of the functions in the virtual machine executable file.

The parsing unit 302 is particularly configured to decompile the virtual machine executable file to virtual machine byte code by a virtual machine executable file decompiling tool.

Herein, the extraction unit 303 is particularly configured to use the functions occurring only in the black sample files but not occurring in the white sample files as a black sample feature or use parts of codes of the functions occurring only in the black sample files but not occurring in the white sample files as a black sample feature; or use the functions occurring only in the white sample files but not occurring in the black sample files as a white sample feature or use parts of codes of the functions occurring only in the white sample files but not occurring in the black sample files as a white sample feature.

Preferably, the device may further comprise: a feature library adding unit 308, configured to add the black sample feature to a black sample feature library; and a matching unit 309, configured to match a target file by the black sample feature library, wherein if the target file contains a function or a subset of function corresponding to the black sample feature, the presence of malicious codes is determined. Herein, the matching unit may particularly use the function corresponding to the black sample feature in the black sample feature library to perform sample feature searching/killing, virtual machine based searching/killing, heuristic searching/killing and/or similar sample clustering on the target file.

Herein, the black sample file refers to a file which is determined to contain the black sample in advance, while the white sample file refers to a file which is determined not to contain the black sample.

Herein, the file acquisition unit 301 is particularly configured to search out an application installation package from the application layer of the intelligent terminal operating system; parse the installation package to a virtual machine executable file of application; and use the virtual machine executable file as the black sample file or the white sample file.

For the specific implementation of the device, reference can be made to the method embodiments. The detailed description thereof will be omitted herein.

Algorithm and display provided herein are not inherently related to a particular computer, virtual system or other equipment. Various general systems may also be used with the teaching based on the disclosure. According to the above description, the required structure for constructing such a system is obvious. In addition, the disclosure is not directed to any specific programming language. It should be understood that a variety of programming languages can be used to implement the disclosed contents as described herein and above description to the specific programming language is used to disclose the best inventive implementation mode.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

Similarly, it should be understood that, in order to simplify the disclosure and to facilitate the understanding of one or more of various aspects thereof, in the above description of the exemplary embodiments of the disclosure, various features of the disclosure may sometimes be grouped together into a single embodiment, accompanying figure or description thereof. However, the method of this disclosure should not be constructed as follows: the disclosure for which the protection is sought claims more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the disclosure.

It should be understood by those skilled in the art that modules of the apparatus in the embodiments can be adaptively modified and arranged in one or more apparatuses different from the embodiment. Modules in the embodiment can be combined into one module, unit or component, and also can be divided into more sub-modules, sub-units or sub-components. Except that at least some of features and/or processes or modules are mutually exclusive, various combinations can be used to combine all the features disclosed in specification (including appended claims, abstract and accompanying figures) and all the processes or units of any methods or devices as disclosed herein. Unless otherwise definitely stated, each of features disclosed in specification (including appended claims, abstract and accompanying figures) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the disclosure and forms the different embodiment. For example, in the claims, any one of the embodiments for which the protection is sought can be used in any combined manners.

Each of components according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the components in the wireless channel redistribution apparatus according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the Internet websites, or be provided in carrier, or be provided in other manners.

Figure 4:
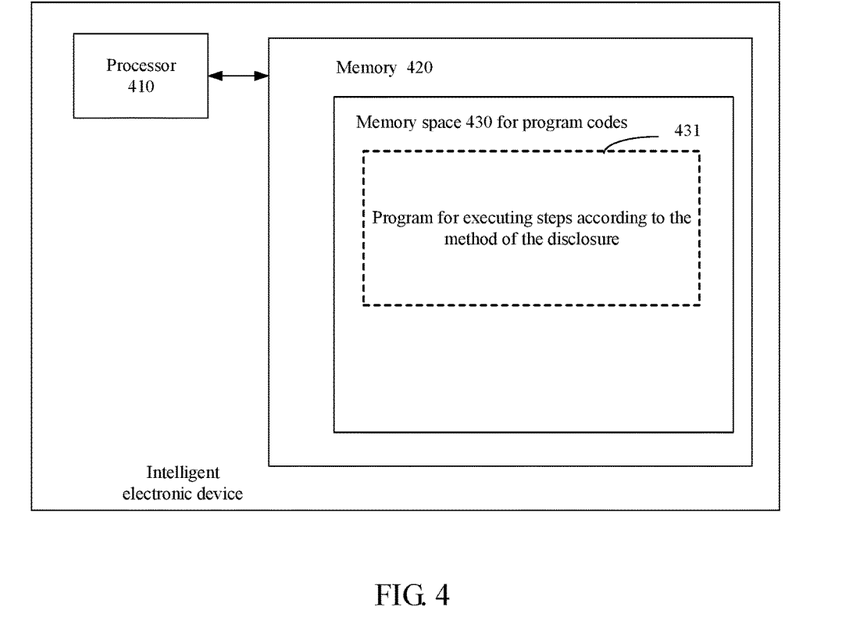
FIG. 4 illustrates a block diagram of a intelligent electronic device for executing the method according the disclosure.
Figure 5:
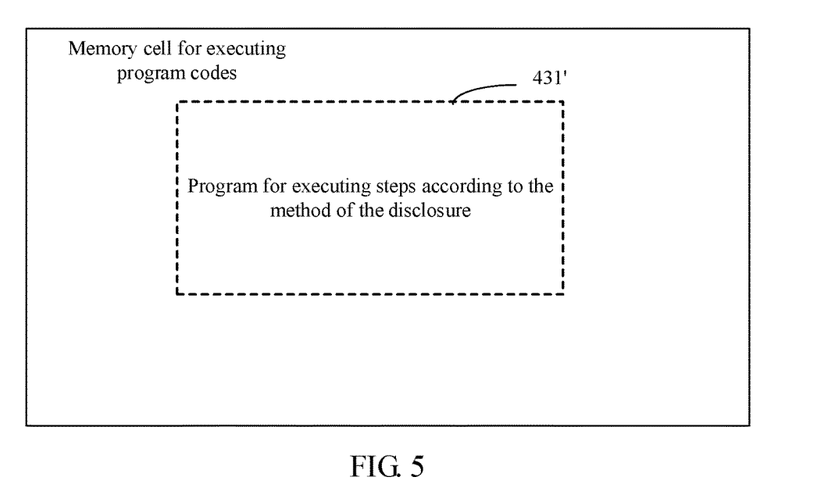
FIG. 5 illustrates a schematic diagram of a memory cell which is used to store or carry program codes for realizing the methods according to the disclosure.

For example, FIG. 4 illustrates an intelligent electronic device which may implement the method for feature extraction according to this disclosure. Traditionally, the electronic device includes a processor 410 and a computer program product or a computer readable medium in the form of a memory 420. The memory 420 could be electronic memories such as flash memory, EEPROM (Electrically Erasable Programmable Read-Only Memory), EPROM, hard disk or ROM. The memory 420 has a memory space 430 for executing program codes 431 of any steps in the above methods. For example, the memory space 430 for program codes may include respective program codes 431 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 5. The memory cells may be provided with memory sections, memory spaces, etc., similar to the memory 420 of the electronic device as shown in FIG. 4. The program codes may be compressed for example in an appropriate form. Usually, the memory cell includes a program 431' for executing the methodic steps according to the disclosure, which could be codes readable for example by a processor 410. When these codes are operated on the electronic device, the electronic device may execute respective steps in the method as described above.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

What is claimed is:

1. A method for feature extraction, comprising:
   acquiring a batch of black sample files and white sample files from an application layer of an intelligent terminal operating system;
   parsing each file to acquire information structures of all functions contained in each file, and calculating a check code for each function;
   determining whether the black sample files and white sample files contain functions corresponding to check codes, and counting an occurrence number of each function in the black sample files and the white sample files;
   extracting a black sample feature based on functions occurring only in the black sample files but not occurring in the white sample files, or extracting a white sample feature based on functions occurring only in the white sample files but not occurring in the black sample files;
   wherein both the black sample files and the white sample files are a virtual machine executable file, and the parsing each file to acquire information structures of all functions contained in each file further comprises:
      decompiling the virtual machine executable file to acquire decompiled information structure of all functions contained in the virtual machine executable file;
   wherein the decompiling the virtual machine executable file to acquire decompiled information structure of all functions contained in the virtual machine executable file further comprises:
      parsing the virtual machine executable file on the basis of a virtual machine executable file to acquire the function information structure body of each class; and
      on the basis of fields in the function information structure body, determining a location and size of each function in the virtual machine executable file to acquire a decompiled function information structure of each function.

2. The method according to claim 1, wherein after the counting an occurrence number of each function in the black sample files and the white sample files, the method further comprises:
   performing feature preference, wherein the performing feature preference further comprises:
   establishing vectors of each of features for all files;
   initializing a set and comparing it in sequence with the vectors of each of features;
   when the set contains compared vectors, keeping the set, or when the set does not contain the compared vectors, getting a union of the set and the compared vectors; and
   comparing with the vectors of all the features in sequence and using the features contained in a resulted set as finally maintained features.

3. The method according to claim 1, wherein after the counting an occurrence number of each function in the black sample files and the white sample files, the method further comprises:
   performing feature preference, wherein the performing feature preference further comprises:
   for different sets of files having different features, when a set of files contains all files in another set of files, keeping features corresponding to the set of files with a broader range while discarding features corresponding to the another set of files with a narrower range.

4. The method according to claim 1, wherein the feature includes a first feature and a second feature, the files containing the first feature form a first file set, and the files containing the second feature form a second file set; when the first file set contains all the files in the second file set, the first feature is kept while the second feature is discarded.

5. The method according to claim 1, wherein the calculating a check code for each function further comprises:
   calculating a Hash value of an information structure body of the function by a Hash algorithm and using the Hash value as the check code of the function.

6. The method according to claim 1, wherein the step of, on the basis of fields in the function information structure body, determining a location and size of each function in the virtual machine executable file, comprises:

parsing the function information structure body to acquire a byte code array field indicating a function location of the virtual machine executable file and a list length field indicating a function size of the virtual machine executable file; and on the basis of the byte code array field and the list length field, determining the location and size of the functions in the virtual machine executable file.

7. The method according to claim 1, wherein the step of decompiling the virtual machine executable file to acquire decompiled information structure of all functions contained in the virtual machine executable file, comprises:

decompiling the virtual machine executable file to virtual machine byte code by a virtual machine executable file decompiling tool.

8. An intelligent electronic device for feature extraction, wherein the intelligent electronic device comprises:

a memory having instructions stored thereon;

a processor configured to execute the instructions to perform operations for feature extraction, the operations comprising:

acquiring a batch of black sample files and white sample files from an application layer of an operating system of the intelligent electronic device;

parsing each file to acquire information structures of all functions contained in each file;

calculating a check code for each function;

determining whether the black sample files and white sample files contain functions corresponding to check codes, and counting an occurrence number of each function in the black sample files and the white sample files;

extracting a black sample feature based on functions occurring only in the black sample files but not occurring in the white sample files, or extracting a white sample feature based on functions occurring only in the white sample files but not occurring in the black sample files;

wherein both the black sample files and the white sample files are a virtual machine executable file, and the parsing each file to acquire information structures of all functions contained in each file further comprises:

decompiling the virtual machine executable file to acquire decompiled information structures of all functions contained in the virtual machine executable file;

wherein the decompiling the virtual machine executable file to acquire decompiled information structure of all functions contained in the virtual machine executable file further comprises:

parsing the virtual machine executable file on the basis of a virtual machine executable file format to acquire the function information structure body of each class; and on the basis of fields in the function information structure body, determining a location and size of each function in the virtual machine executable file to acquire a decompiled function information structure of each function.

9. The intelligent electronic device according to claim 8, wherein the processor is further configured to perform:

establishing vectors of each of features for all files;

initializing a set, comparing the set in sequence with the vectors of each of features;

when the set contains compared vectors, keeping the set, or when the set does not contain the compared vectors, getting a union of the set and the compared vectors; and comparing with the vectors of all the features in sequence and using the features contained in a resulted set as finally maintained features.

10. The intelligent electronic device according to claim 8, wherein the processor is further configured to perform:

for different sets of files having different features, when a set of files contains all files in another set of files, keeping features corresponding to the set of files with a broader range while discarding features corresponding to the another set of files with a narrower range.

11. The intelligent electronic device according to claim 8, wherein the feature includes a first feature and a second feature, the files containing the first feature form a first file set, and the files containing the second feature form a second file set; when the first file set contains all the files in the second file set, the first feature is kept while the second feature is discarded.

12. The intelligent electronic device according to claim 8, wherein on the basis of fields in the function information structure body, determining a location and size of each function in the virtual machine executable file, comprises:

parsing the function information structure body to acquire a byte code array field indicating a function location of the virtual machine executable file and a list length field indicating a function size of the virtual machine executable file; and on the basis of the byte code array field and the list length field, determining the location and size of the functions in the virtual machine executable file.

13. The intelligent electronic device according to claim 8, wherein the extracting a black sample feature based on functions occurring only in the black sample files but not occurring in the white sample files further comprises: using the functions occurring only in the black sample files but not occurring in the white sample files as a black sample feature or use parts of codes of the functions occurring only in the black sample files but not occurring in the white sample files as a black sample feature; and wherein the extracting a white sample feature based on functions occurring only in the white sample files but not occurring in the black sample files further comprises: using the functions occurring only in the white sample files but not occurring in the black sample files as a white sample feature or use parts of codes of the functions occurring only in the white sample files but not occurring in the black sample files as a white sample feature.

14. The intelligent electronic device according to claim 8, wherein the processor is further configured to perform:

adding the black sample feature to a black sample feature library; and matching a target file by the black sample feature library, wherein when the target file contains a function or a subset of function corresponding to the black sample feature, the presence of malicious codes is determined.

15. The intelligent electronic device according to claim 8, wherein a black sample file refers to a file which is determined to contain the black sample in advance, while a white sample file refers to a file which is determined not to contain the black sample.

16. A non-transitory computer readable medium, having computer program stored thereon that, when executed by one or more processors of an intelligent electronic device, cause the intelligent electronic device to perform;

acquiring a batch of black sample files and white sample files from an application layer of an intelligent terminal operating system;

parsing each file to acquire information structures of all functions contained in each file, and calculating a check code for each function;

determining whether the files contain the functions corresponding to the check codes, and thus counting the occurrence number of each function in the black sample files and the white sample files;

extracting a black sample feature on the basis of functions occurring only in the black sample files but not occurring in the white sample files, or extracting a white sample feature on the basis of functions occurring only in the white sample files but not occurring in the black sample files;

wherein both the black sample files and the white sample files are a virtual machine executable file, and the parsing each file to acquire information structures of all functions contained in each file further comprises:

decompiling the virtual machine executable file to acquire decompiled information structures of all functions contained in the virtual machine executable file;

wherein the decompiling the virtual machine executable file to acquire decompiled information structure of all functions contained in the virtual machine executable file further comprises:

parsing the virtual machine executable file on the basis of a virtual machine executable file format to acquire the function information structure body of each class, and on the basis of fields in the function information structure body, determining a location and size of each function in the virtual machine executable file to acquire a decompiled function information structure of each function.

* * * * *